United States Patent [19]

Czumak et al.

[11] 4,155,634
[45] May 22, 1979

[54] FILM CASSETTE CONTAINED PROCESSING FLUID APPLICATOR HAVING CONVERGING FLUID CHANNEL

[75] Inventors: Frank M. Czumak, Derry, N.H.; Paul B. Mason, Magnolia, Mass.

[73] Assignee: Polaroid Corporation, Cambridge, Mass.

[21] Appl. No.: 791,025

[22] Filed: Apr. 26, 1977

[51] Int. Cl.² .............................................. G03C 11/00
[52] U.S. Cl. .................................. 352/130; 352/78 R
[58] Field of Search ........................ 352/72, 78 R, 130

[56] References Cited

U.S. PATENT DOCUMENTS 3,951,530  4/1976  Czumak et al. ...................... 352/130

Primary Examiner—Monroe H. Hayes
Attorney, Agent, or Firm—Frederick A. Goettel, Jr.; David R. Thornton

[57] ABSTRACT

A doctoring surface conformation for applicator nozzle structures in photographic film cassette contained processors by which a coating of processing fluid may be deposited on a moving run of an exposed film strip. The doctoring surface conformation is defined as a planar surface spaced in parallel relation to the film strip which is urged toward a pair of guide tracks positioned on opposite sides of the planar surface. The sides or edges of the doctoring surface are delimited by vertical walls converging in the direction of film strip travel so as to develop a suitable hydrodynamic force in the processing fluid while minimizing the capture of minute foreign particles such as dust which may be carried on the surface of the film strip to be coated.

5 Claims, 7 Drawing Figures

FILM CASSETTE CONTAINED PROCESSING FLUID APPLICATOR HAVING CONVERGING FLUID CHANNEL

BACKGROUND OF THE INVENTION

This invention relates to photographic film processing apparatus and more particularly, it concerns an improved doctoring surface conformation for use in an applicator nozzle structure for depositing a uniform layer of processing fluid on a run of cassette contained photographic film.

Motion picture systems in which exposure, processing and projection operations are carried out on a film strip contained at all times in a multi-purpose cassette are disclosed in several issued U.S. patents, assigned in common with the present invention. In these systems the strip of film, as supplied with the cassette, is initially wound on a supply spool and advanced to a take-up spool when the cassette is placed in an appropriate camera for exposure in essentially conventional fashion. After exposure, the cassette is placed into a viewing apparatus capable of activating a cassette contained processor to deposit a uniform layer or coating of processing fluid along the length of the film strip as it is rewound from the take-up spool back to the supply spool. Thereafter, the series of successive transparent image frames formed on the film strip may be viewed by projection and rewound for subsequent projection cycles as desired.

The achievement of a uniform layer or coating of processing fluid on the film strip during the processing operation is vital to overall system operation and has been a major focal point of attention in overall system development. The current state of the art with respect to achieving a uniform coating of processing fluid on such cassette contained film strips is represented by the disclosures of U.S. Pat. Nos. 3,871,073 issued Mar. 11, 1975 to Edward F. Burke and Douglas B. Holmes and 3,951,530 issued Apr. 20, 1976 to Frank M Czumak, Paul B. Mason and Joseph A. Stella, both of which patents are commonly assigned with the present invention. In the disclosures of these patents, an inclined doctoring surface is used to develop a positive hydrodynamic force in the deposited processing fluid to thereby hold the film in engagement with an underlying pressure pad; the latter being operative to support the film strip beneath the doctoring surface in a manner to provide a net balance of forces on opposite sides of the film strip.

Because of the need for cassette ventilation both to dry the processing fluid and to cool the film strip during projection, and also because of the environment to which the cassette may be exposed in normal use, it is difficult if not impossible to prevent entry of foreign particles and/or dust to the cassette interior. While the presence of such particles is not a serious problem to film strip exposure and projection, it is critical to proper film strip processing that foreign particles present on the film strip be prevented from accumulating in the region of the doctoring surface by which the processing fluid is spread uniformly onto the film strip. The achievement of a net balance of forces on opposite sides of the film strip as it passes the doctoring surface in accordance with the disclosure of the aforementioned issued U.S. patents has contributed substantially to the solution of this problem by permitting film strip carried particles to pass the doctoring surfaces without accumulation and without dragging or streaking the processing fluid in a manner to create blemishes which will appear in the viewed images of the processed film. There remains, however, a potential for accumulation or wedging of foreign particles as a result of the inclination of the doctoring surface toward a trailing end which provides a narrowing gap between the doctor blade and the film. Because of this potential, there is need for improvement, particularly in light of the processor being a once-used structure supplied with a cassette which serves primarily as a package for the initially supplied film strip and as a container by which it may be manipulated for exposure and repeated projection cycles.

SUMMARY OF THE PRESENT INVENTION

In accordance with the present invention, the potential for problems associated with the presence of dust or other foreign particles on a film strip during a deposition of processing fluid from a cassette contained processor is minimized by the provision of a processing fluid applicator nozzle structure in which a doctoring surface determining the thickness of processing fluid coating on the film strip is essentially parallel to the upper emulsion surface on a linear run of the film strip and wherein hydrodynamic forces are developed by converging edge wall surfaces depending from either side of the doctoring surface. As in prior devices, the film strip is retained upwardly against the under side of the nozzle by a yieldable force balancing the hydrodynamic force developed in the fluid by the nozzle. The doctoring surface is spaced from the upper emulsion surface of the film strip by a pair of depending planar guide tracks in which the converging edge wall surface formations are provided. As a result of this construction, there is no inclined doctor blade and will be no tendency for foreign particles to accumulate at the trailing end of the nozzle surface in any way effecting uniformity of coating application across the full width of the emulsion in which image frames are formed.

Among the objects of the invention are, therefore: the provision of an improved apparatus for the application of processing fluid to the emulsion side of the photographic film strip; the provision of an improved processor for film strips contained in multi-purpose film cassettes; the provision of such a processor having an improved doctoring nozzle structure for minimizing the effect of or eliminating foreign particle accumulation on critical surfaces during the application of processing fluid onto the film strip; and the provision of such a nozzle structure capable of manufacture at costs which are practical for a once-used component in a mass produced film cassette.

Other objects and further scope of applicability of the present invention will become apparent from the detailed description to follow taken in conjunction with the accompanying drawings in which like parts are designated by like reference numerals.

DETAILED DESCRIPTION OF THE PREFERRED EMBODIMENTS

Figure 1:
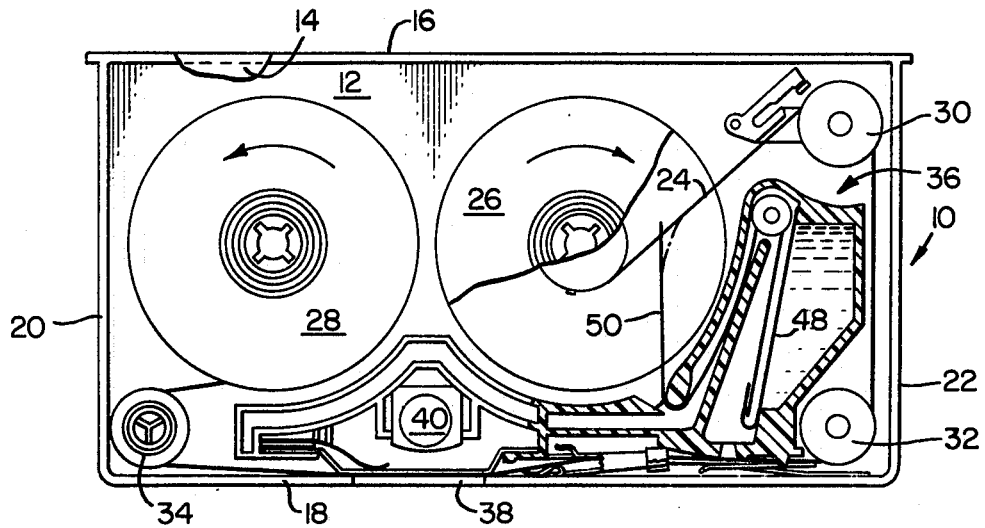
FIG. 1 is a side elevation in partial cross-section illustrating the interior arrangement of a cassette incorporating the present invention.
Figure 2:
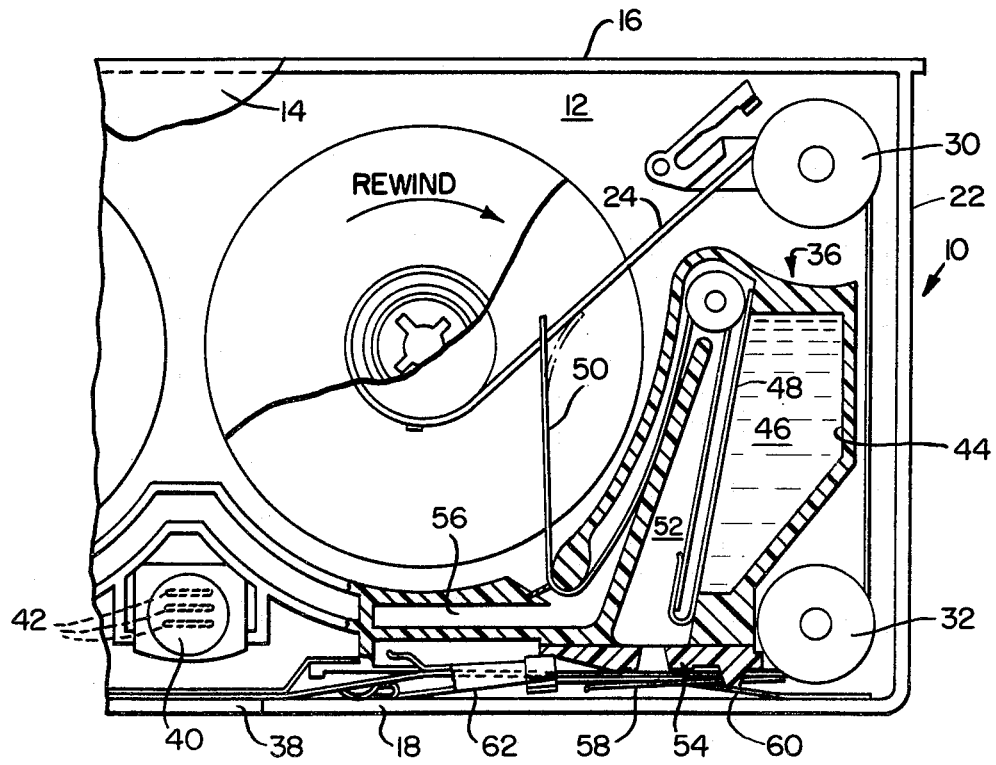
FIG. 2 is an enlarged, fragmentary side elevation showing the processor of the invention.

In FIGS. 1 and 2 of the drawings, a multi-purpose film cassette incorporating the present invention is shown to include a housing generally designated by the reference numeral 10 and taking the form of a rectangular parallelepiped having a pair of exterior side walls 12 and 14 connected by top, bottom and end walls 16, 18, 20 and 22, respectively. Within the housing 10, a film strip 24 is connected at opposite ends to supply and take-up spools 26 and 28 for movement through a series of linear flights or runs defined by a bobulator roll 30, an idler guide roller 32 and a snubbing roller 34. The run of the film strip 24 between the guide roller 32 and the snubbing roller 34, in passing from the supply spool 26 to the take-up spool 28 transverses a processor, designated generally by the reference numeral 36, and an exposure/projection aperture 38 in the bottom housing wall 18 under a reflecting prism 40 located adjacent ventilating openings 42 in the side wall 12.

The processor 36 includes a reservoir or pod 44 of processing fluid 46 initially sealed by tear strip 48 and connected to a film strip engaging pull strip 50. The construction and operation of the pull strip 50 is fully disclosed in U.S. Pat. No. 3,895,862 issued July 22, 1975 to Joseph A. Stella et al and need not be further described here except to note that upon initiation of a processing cycle, the pull strip becomes engaged by an aperture (not shown) in the trailing end portion of the film strip 24 to pull the tear strip 48 away from the pod or reservoir 44 and allow the processing fluid 46 to flow into a chamber 52 closed at its bottom by an applicator nozzle 54 to be described in more detail below. At the completion of tear strip removal, the pull strip 50 becomes wound between the convolutions of the film strip wrapped on the supply spool 26 whereas the tear strip 48 becomes separated to remain in a storage chamber 56.

Also in accordance with the disclosures of prior patents including those mentioned above, the flight of the film strip 24 between the rollers 32 and 34 is situated between the bottom of the nozzle 54 and a pressure pad 58 biased upwardly by a spring 60 supported in the bottom wall 18 of the housing 10. A valve member 62 is positioned behind the nozzle 54 in the context of film strip travel during exposure and projection (ahead in the context of film strip rewind movement during processing) and is engageable by an aperture (not shown) in the leading end portion of the film strip 24 to be advanced from the position shown to a position underlying the nozzle 54 at the end of a processing operation.

The general organization of cassette components illustrated in FIGS. 1 and 2 as well as the operation of such components during exposure, processing and projection of the film strip 24, without removal thereof from the housing 10, is summarized herein principally for the purpose of providing an understanding of the environment in which the improved structure of the nozzle 54 is used. For example, it will be noted that although the housing 10 constitutes an essentially light-tight enclosure for the film strip 24, openings such as the vent openings 42 and the exposure/projection opening 38, which are important to overall system operation, prevent exclusion of foreign particles such as dust to the housing interior. While the effect of foreign particles on the film strip 24 or otherwise within the cassette interior, during use of the cassette to expose the film strip 24 or to project the transparent image frames formed thereon after processing, is not significantly different than it is on conventional exposure or projection of motion picture film strips, it is important to completely satisfactory operation of the processor 36 that such foreign particles not interfere with the achievement of a uniform layer of the processing fluid 46 on the exposed emulsion layer of the film strip.

Figure 3:
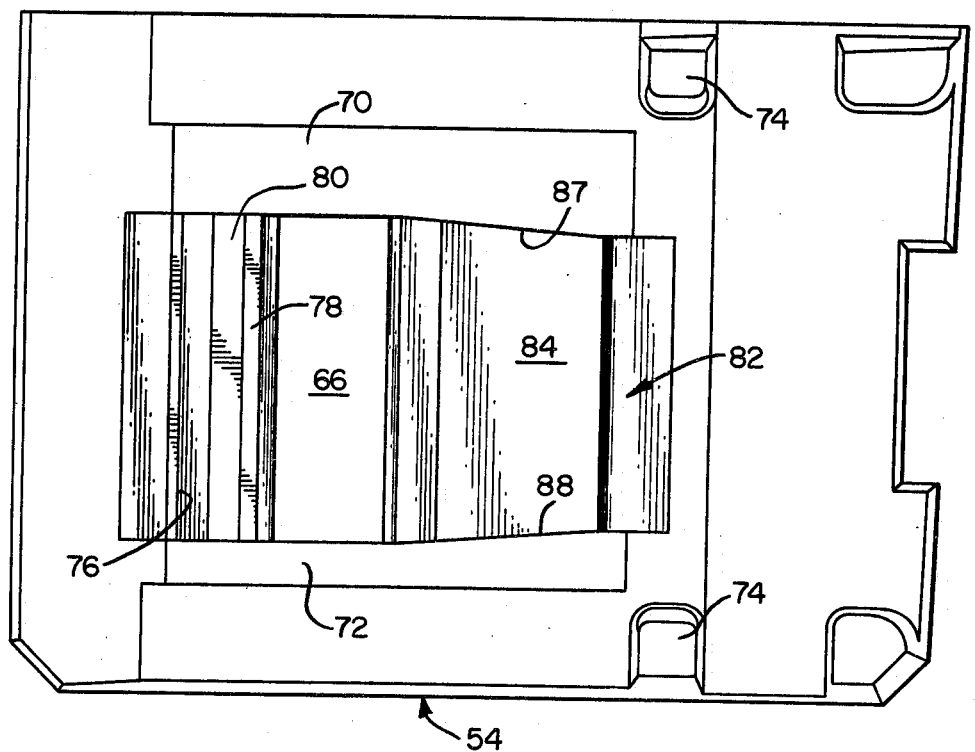
FIG. 3 is an enlarged bottom plan view of a processor nozzle incorporating the invention.
Figure 4:
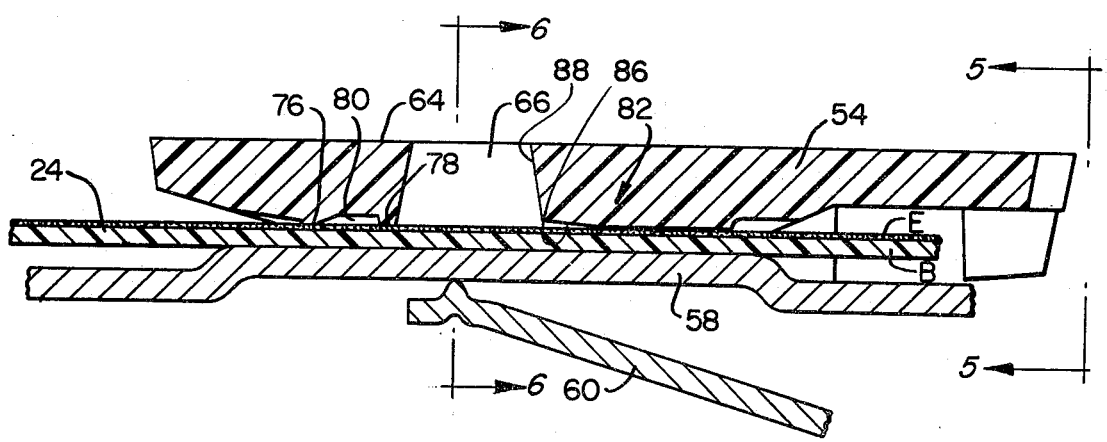
FIG. 4 is a greatly enlarged sectional view of a nozzle portion of the processor of the invention.
Figure 5:
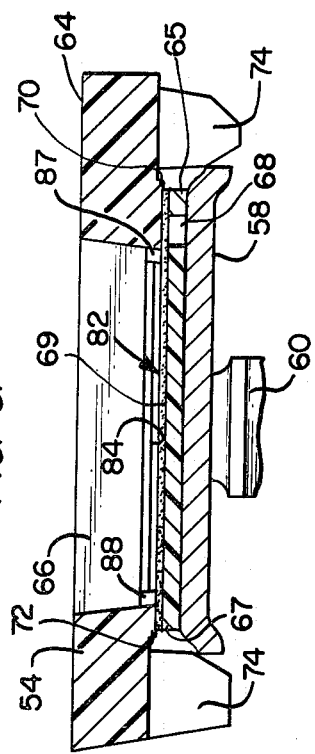
FIG. 5 is an end view as seen on line 5—5 of FIG. 4.

An understanding of the improved nozzle structure of the present invention and its use in operation may be gained by reference to FIGS. 3-7 of the drawings in which a preferred embodiment is illustrated. The nozzle 54 is an integral molding of suitable synthetic resinous material having an essentially planar top surface 64 adapted to be secured in a suitable manner such as by ultrasonic welding, thermal fusion or adhesives to the bottom of the processor 36 in the general relationship described above with respect to FIG. 2. A generally rectangular nozzle opening 66 opens through the upper surface 64 and extends to the opposite side or bottom of the nozzle against which the film strip 24 is retained by the pressure pad 58 during processing. In FIGS. 4 and 5, the film strip 24 is illustrated in greater detail to include an emulsion layer E at a carrier base B. While as shown in FIG. 5 of the drawings, the emulsion layer E extends completely across the width of the carrier base throughout framing margins, 65 and 67, the useable image width 69 is confined to the lateral separation therebetween. Additionally, one margin 65 is of greater width than the other so to include perforations or feed apertures 68 for engagement by an incremental feed mechanism or shuttle (not shown) during exposure and projection.

In FIG. 3, the surface configuration of the underside of the nozzle 54 presented to the film strip 24 is shown to include elongated planar guide tracks 70 and 72 located on the opposite sides or lateral edges of the nozzle opening 66 in overlying relation to the film margins 65 and 67; the track 70 being somewhat wider than the track 72 because of the wider margin required on one side of the film strip to accommodate the feed aperture 68. A pair of post-like abutments 74 depend from the undersurface of the nozzle and function to laterally guide the film past the nozzle and as stops for the valve member 62.

As described and claimed in the commonly assigned, copending application Ser. No. 791,136 filed on even date herewith, configuration of the nozzle 54 to the left of the opening 66 in FIGS. 3 and 4, or upstream from the nozzle opening in terms of film strip travel during processing, is provided with a pair of transverse linear projections or scraper blade formations 76 and 78 spaced longitudinally by a transverse recess 80. The scraper blade formations 76 and 78 terminate downwardly in planar bottom surfaces elevated slightly from the surface of the tracks 70 and 72 by a distance preferably on the order of 0.0001 inch but may approach zero or to a point where the bottom surfaces of the scraper blade formations 76 and 78 are truly flush with the surface of the guide tracks 70 and 72.

Figure 6:
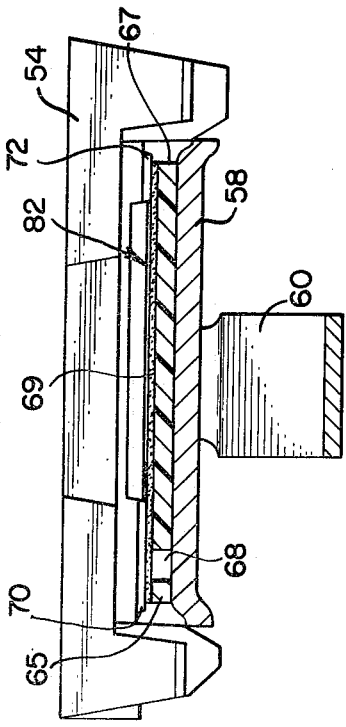
FIG. 6 is a cross-section taken on line 6—6 of FIG. 4.
Figure 7:
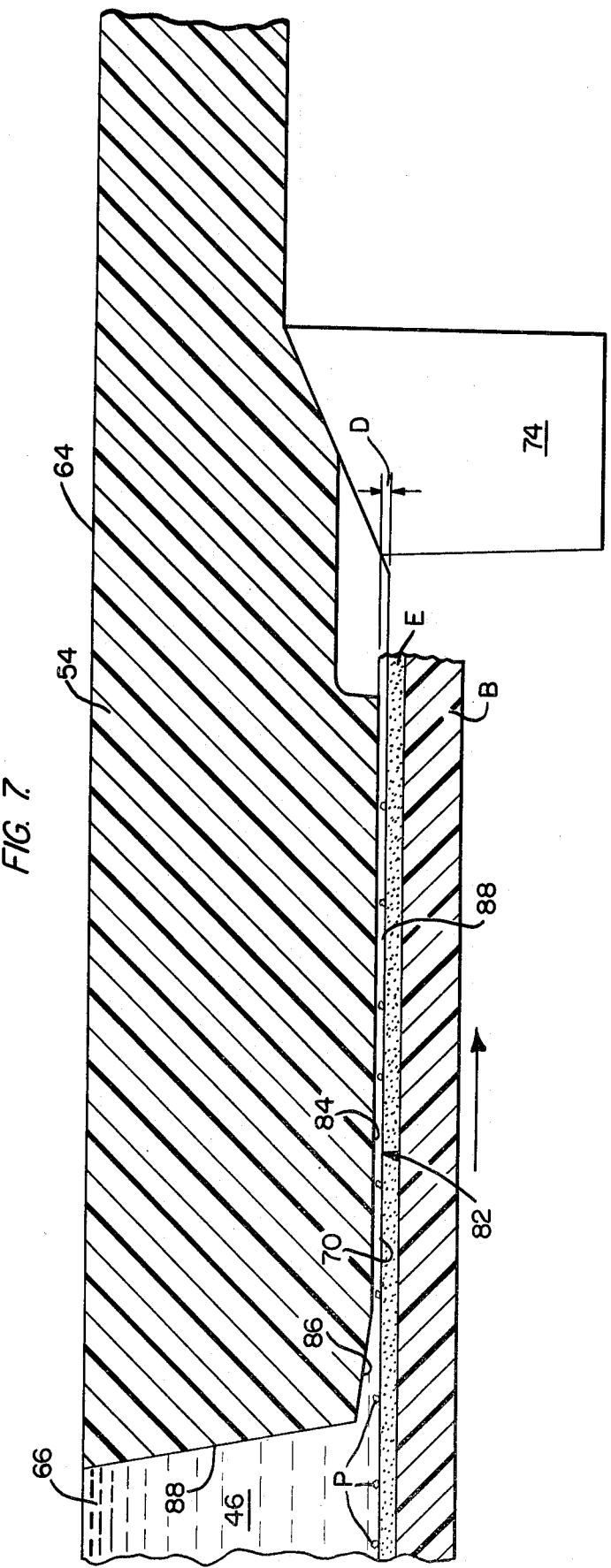
FIG. 7 is a vastly enlarged fragmentary cross-section of the nozzle arrangement FIG. 4.

To the right of the nozzle opening 66 as it is shown in FIGS. 3, 4 and 7 of the drawings, or downstream in terms of the direction of film strip travel during processing, the doctoring surface conformation of the present invention is shown and generally designated by the reference numeral 82. The overall configuration of the doctoring surface is shown most clearly in FIGS. 3, 6 and 7 of the drawings to include a downwardly facing planar surface 84 recessed from the plane of the tracks 70 and 72 by a distance D (FIG. 7) and joining at its forward or upstream end with an inclined surface 86 extending to the rear edge surface 88 of the nozzle opening 66.

As can be seen in FIGS. 3 and 6, the marginal edges of the doctoring surface 84 are delimited by vertical wall surfaces 87 and 88 which extend from the surface 84 to the tracks 70 and 72 respectively. These wall surfaces 87 and 88 are inclined toward each other so as to converge in the direction of film strip travel or in a direction downstream from the nozzle opening 66. Hence, they provide a tapered channel whose cross-section defined by the upper surface of the emulsion E, the doctoring surface 84 and the wall surfaces 87 and 88 progressively diminishes lateral to the film, from the leading to the trailing edge of the doctoring surface 84. This diminishing cross-section of the doctoring gap width creates in the processing fluid 46 a hydrodynamic force against the film without any reduction in the doctoring gap height.

Hence, the substantially parallel doctoring surface 84 in conjunction with the converging wall surfaces 87 and 88 produce the desired downward force on the film (the latter being balanced by the pad 58) without a progressively narrowing of the doctor blade gap height as used heretofore.

As pointed out above, the scraper blade formations 76 and 78 depend to an elevation on the order of 0.0001 inch above the top surface of the emulsion layer E. As a result, dust or other particles carried by the film strip 24 and projecting above the top of the emulsion layer E by a distance greater than this clearance will be trapped by the scraper blade formations 76 and 78. To ensure that such particles will pass the doctoring surface 84 without adversely affecting the smoothness or uniformity of the layer of processing fluid to be deposited on the emulsion layer, and because of the required thickness of the processing fluid layer, the dimension D is preferably on the order of 0.0007 inch and will result in a coating thickness of approximately 0.0005 inch. Thus, any particles carried by the film strip such as those designated by the letter P in FIG. 7, passing the scraper blade formations will pass under the surface 84 without accumulation to an extent where streaking or other interference with the achievement of a uniform layer of processing fluid will not occur. Moreoever, any tendency for accumulation of particles with the geometry of the processing fluid doctoring surface as shown will be either at the leading edge of the downwardly facing surface 84 or along the vertical wall surfaces 87 and 88, neither of which will affect the processing fluid coating over usable central portion of the film strip on which images are to be formed since effects of the former will be healed by the subsequent doctoring while the effects of the latter will occur only at the film margins. For the above, a tapering in of the walls 87 and 88 by 0.005 inch over a length of approximately 0.100 inch will provide suitable fluid pressure.

Thus it will be appreciated that as a result of this invention, an improved nozzle structure is provided for photographic film strip processors and by which the abovementioned objectives are completely fulfilled. Also it will be apparent to those skilled in the art that modifications and/or changes may be made in the illustrated embodiment without departure from inventive concepts manifested thereby. Accordingly, it is expressly intended that the foregoing description is of a preferred embodiment only, not limiting, and that the true spirit and scope of the present invention be determined by reference to the appended claims.

What is claimed is:

1. In a cassette containing an elongated strip of photographic film having a light sensitive emulsion on one surface thereof and containing also a processor to deposit a layer of processing fluid on at least the emulsion portion intermediate the film margins during a moving run of the film after exposure thereof, the processor including a nozzle member positioned to overlie the moving run of the film and having a nozzle opening to provide the processing fluid layer on the emulsion, the improvement comprising:

means defining a surface conformation on the nozzle member downstream from the opening in the direction of film strip movement, said conformation including a doctoring surface located in spaced parallel relation to the emulsion surface of the film, and said wall sufaces extending from the doctoring surface toward engagement with the emulsion surface overlying the film margins, said side wall surfaces converging toward each other in the direction of film strip movement so as to produce a positive hydrodynamic force in the fluid passing under said doctoring surface.

2. The apparatus recited in claim 1 including a downwardly inclined surface extending from the nozzle opening to said doctoring surface.

3. In a processing fluid applicator for photographic film cassettes containing an elongated strip of photographic film, said applicator containing a supply of such fluid to be deposited on at least the emulsion portion intermediate the film margins during a moving run of the film strip which is urged toward a pair of downwardly facing planar guide tracks laterally spaced to straddle the intermediate portion of the film strip and on opposite sides of a nozzle opening through which the fluid is deposited onto the intermediate portion of the film strip, the improvement comprising:

means defining a surface conformation on the nozzle member downstream from the opening in the direction of film strip movement, said conformation including a doctoring surface elevated above said planar guide tracks and parallel thereto, and side wall surfaces extending from said doctoring surface to said planar guide tracks, said side wall surfaces converging toward each other in the direction of film run movement thereby to develop a positive hydrodynamic force under said doctoring surface.

4. The apparatus recited in claim 3 including a downwardly inclined surface between the nozzle opening and said doctoring surface.

5. The apparatus recited in claim 3 wherein said doctoring surface is elevated above the level of the planar guide tracks by a distance on the order of 0.0007 inch.

* * * * *